(12) United States Patent
Bayer

(10) Patent No.: US 11,679,288 B2
(45) Date of Patent: Jun. 20, 2023

(54) WARNING DEVICE FOR DANGEROUS SITUATIONS

(71) Applicant: BEDA Oxygentechnik Armaturen GmbH, Ratingen (DE)

(72) Inventor: Reinhardt Bayer, Duisburg (DE)

(73) Assignee: BEDA OXYGENTECHNIK ARMATUREN GMBH, Ratingen (DE)

( * ) Notice: Subject to any disclaimer, the term of this patent is extended or adjusted under 35 U.S.C. 154(b) by 565 days.

(21) Appl. No.: 16/775,323

(22) Filed: Jan. 29, 2020

(65) Prior Publication Data
US 2020/0246647 A1    Aug. 6, 2020

(30) Foreign Application Priority Data

Jan. 31, 2019   (DE) ............... 10 2019 102 486.2

(51) Int. Cl.
| | |
|---|---|
| *A62C 2/04* | (2006.01) |
| *C21C 5/46* | (2006.01) |
| *F16K 17/38* | (2006.01) |
| *F27D 3/16* | (2006.01) |

(52) U.S. Cl.
CPC ............... *A62C 2/04* (2013.01); *C21C 5/462* (2013.01); *F16K 17/383* (2013.01); *F27D 2003/169* (2013.01)

(58) Field of Classification Search
None
See application file for complete search history.

(56) References Cited

U.S. PATENT DOCUMENTS

| | | | | |
|---|---|---|---|---|
| 3,701,518 A | * | 10/1972 | Herff ............... | C21C 5/4673 266/94 |
| 4,317,561 A | * | 3/1982 | Schulz .............. | C21C 5/462 266/268 |
| 2016/0069748 A1 | * | 3/2016 | Matusewicz .......... | G01J 5/004 374/130 |
| 2020/0246647 A1 | * | 8/2020 | Bayer ............... | F27D 21/04 |

FOREIGN PATENT DOCUMENTS

DE            19903473 A1    10/1999

* cited by examiner

*Primary Examiner* — Scott R Kastler
(74) *Attorney, Agent, or Firm* — Cermak Nakajima & McGowan LLP; James Creighton Wray

(57) ABSTRACT

When using oxygen gas pipes 3, situations can arise, in particular due to slag return and similar dangers, in which the operator must initiate safety measures. Slag return safety devices are known which, in such a case, ensure that the gas flow is stopped by melting a cap 35 of a heat sensor 5. The response of this outlet valve 6 of the slag return safety device can be recognized, for example, by the fact that the inlet pressure of the existing oxygen gas 4 is used to push pins 21 located in the wall 19 of the oxygen gas pipe 3 beyond the outside 27 of the oxygen gas pipe 3, so that they cannot be overlooked as a warning signal. The movement of the pins 21 can be used to activate further signal systems 30 in order to provide additional indications of this movement optically and/or acoustically.

10 Claims, 3 Drawing Sheets

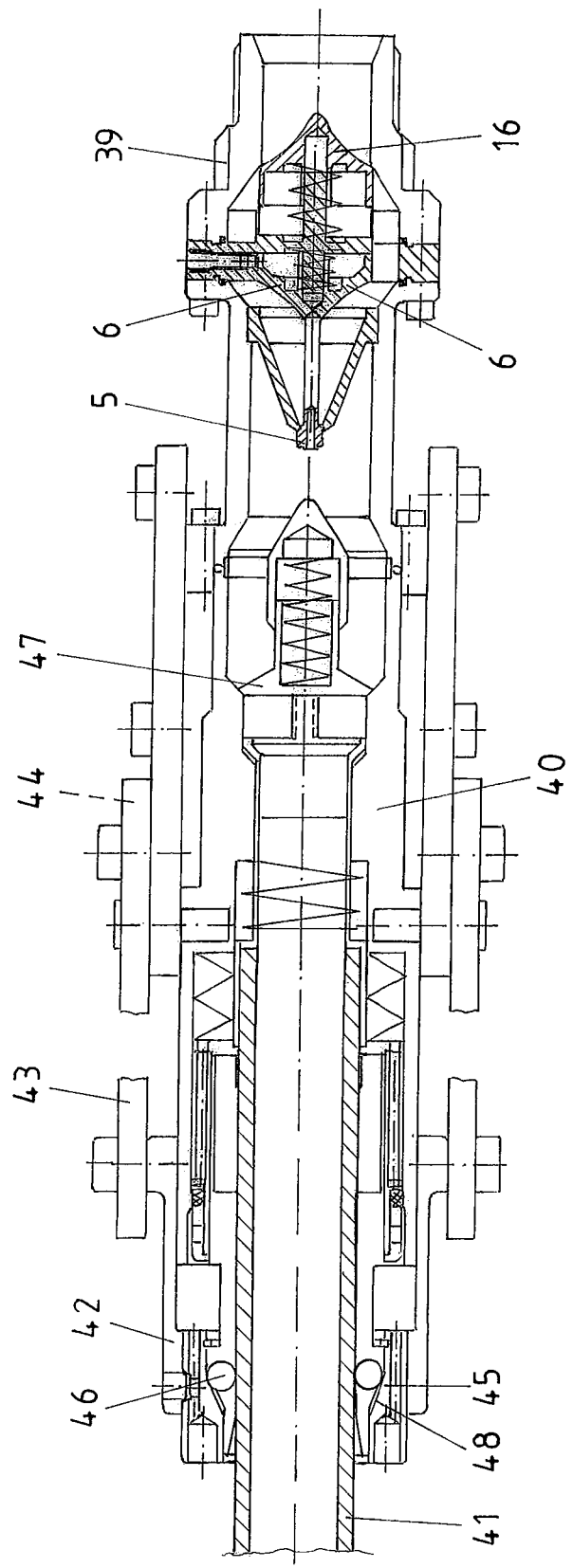

WARNING DEVICE FOR DANGEROUS SITUATIONS

This application claims the benefit of German Application No. 10 2019 102 486.2 filed Jan. 31, 2019, which is hereby incorporated by reference in its entirety as if fully set forth herein.

The invention concerns a display device for indicating dangerous situations for gas-conveying lines, in which, in particular, oxygen gas pipes are integrated, and with the danger of ignition of the oxygen gas, the oxygen gas pipe is designed to lock, and is equipped with a heat sensor and an outlet valve that can be initiated against a primary recoil spring, and an inlet valve that is blocked in case of gas supply failure, in which the outlet valve is shaped like a bowl, with the bowl edge designed as a support on a partition wall, forming a cavity, which is connected, from the back of the bowl, to the heat sensor via a punch, and in which the with the inlet valve is arranged on the other side of the partition wall, and is designed to open based on the gas pressure of the oxygen gas against the returning force of a secondary recoil spring.

A slag return safety device, and not a display device, is known from DE 199 03 473 A1. This slag return safety device is equipped, as described, with a double valve, i.e. an inlet valve and an outlet valve, in which the outlet valve then responds when a dangerous situation occurs, which usually involves the return of incandescent slag, which flows back through the lance pipe that runs through the oxygen gas into the lance holder and thus into an area where there is a risk of injury to employees. An attentive employee will notice this dangerous situation, especially since the gas flow is blocked by the closed inlet valve. With a less attentive employee, however, this could lead to dangerous situations because it is not visible to him/her in any way that such a dangerous situation exists.

The invention is therefore based on the objective of providing a display device on a gas-conveying line that is equipped with a safety valve, with the display device clearly indicating the response from the safety valve.

The objective is achieved by the invention in that the wall of the oxygen gas line has at least one through bore in the area of the outlet valve, in which a sliding pin is mounted, and whose opening part under the pin is connected to the cavity, which is under residual pressure from the oxygen gas, when the heat sensor responds by closing the outlet valve.

With this type of solution to the problem, it will be clearly visible to the employee in a very simple manner that the outlet valve has responded, for example, to the slag return safety device. The fact that with the displacement of the outlet valve, i.e. its closure, the open part underneath the pin is connected with the cavity that is under residual pressure from the oxygen gas, it can be effective against the pin, i.e. the pin can be moved by the gas pressure so that the operator must immediately notice this pin because the slag return safety device with the two valves is directly connected to the lance holder.

In order to prevent the oxygen gas, which is under high residual pressure, from flowing past the pin, the invention provides for the pin to have a seal at the lower end, facing the cavity. This seal is attached and designed such that it provides a seal, but only slightly affects the movement of the pin.

In order to ensure that the employee, who might, for example, be using a lance, is immediately warned by the display device, the pin is designed to be able to slide, based on the inlet pressure, into a position with a significant projection over the outside of the oxygen gas pipe. In normal operation, the pin is positioned so that it practically sits in the wall of the housing and is not noticed by the operator. However, if the outlet valve or the heat sensor responds, the pin is pushed so far beyond the inlet gas that it cannot go unnoticed.

If an even more clear warning for the employee is desired, there is the possibility of designing and arranging the pin so that it influences a signaling system. For example, the pin can drive against a button that can switch on a signal device. This signal device can be optical and/or acoustic.

Another possibility for increasing the warning effect is for the pin to be fitted with a signal lamp on the end that can be pushed out through the through bore, which is designed to switch on after a predetermined projection over the outside of the oxygen gas pipe is achieved. The signal lamp can be, for example, a flashing lamp, which, as described above, is switched on by the pin.

If it is also desired that acoustics be used, it is advantageous if the pin has a whistle, which, after the pin is extended, connects with the cavity between the partition wall and the interior of the bowl. Here, the fact that the inlet pressure inside the cavity, i.e. inside of the bowl, is very high is useful. Based on the invention, this makes use of the fact that the gas, after reaching the end position of the pin, is given the opportunity to escape through the whistle.

The closing of the outlet valve and the switching on of the display device are supported by the fact that the bowl-like outlet valve has a heat sensor on the bottom with a punch on its free end, which is designed to be destructible in the even that it is triggered. With the destruction of the punch, the outlet valve is immediately pushed by the associated spring into the seal position, which results in the punch no longer being able to have any influencing effect.

With a response by the outlet valve, the action of the recoil spring is supported by the pressure of the inlet gas and the outlet valve almost shoots into the closed position. This makes the pin move out, as mentioned above.

The heat sensor, mentioned multiple times above, responds when a certain temperature is exceeded. Then the punch pushes through and the outlet valve closes. In order to be able to set this process precisely, the invention provides for the heat sensor to be designed as a heat-unstable cap, which is located on the end of the punch and prevents the punch from being pushed beyond the pre-tensioned primary recoil spring of the outlet valve. The term heat instability should be understood to mean that the cap should melt when a predetermined temperature is reached, which then allows the movement of the punch.

The closure of the outlet valve is effected by the primary recoil spring together with the gas pressure in the cavity, whereby, according to the invention, a secure engagement of the primary recoil spring is ensured by the fact that the closure of the outlet valve in the event of danger is effected by the primary recoil spring, which is arranged on the partition wall to support the interior of the bowl. Thus, the primary recoil spring is housed in a "closed" space so that the gas cannot flow around the spring and cause turbulence. This ensures that the outlet valve is closed quickly and safely in case of danger.

It was mentioned above that, according to the invention, the device works together with a lance holder. In addition, the invention provides for the outlet valve to be equipped with a pin and housed in a valve housing with an inlet valve, which is arranged on the other side of the partition wall, which can be coupled to a lance holder housing for oxygen-conveying lance pipes, whose clamping sleeve is connected over a toggle lever in an articulated manner via a hand lever and is shaped to impact a pressure sleeve, which is arranged and designed over the clamping sleeve to apply pressure to the clamping balls on an inserted lance tube, which, with the displacement of the clamping sleeve and the pressure sleeve, as well as the fixed lance pipe, opens a shut-off valve and enables the gas flow through the shut-off valve and releases the display device, which can be moved in connection with the potential source of danger. The lance pipe is held or inserted into the liquid steel with this type of lance holder in order to be able to direct the outflowing oxygen gas into the liquid steel in a targeted manner. This can lead to problems because liquid slag that is floating on the liquid steel can flow into the lance pipe and get into the lance holder. Any danger from this can be prevented by the display device, according to the invention, since the display device is initiated early, i.e., the outlet valve is closed and the associated pin(s) are pushed outward so that the operator cannot overlook them. He/she will notice the danger immediately and can act accordingly.

The invention is characterized in particular by the fact that the response of the outlet valve can be recognized from the outside in a very simple and always reliable manner. This is done automatically, i.e. it requires no further electrical or electronic measures because the invention makes use of the gas pressure that is present in the outlet valve to extend the pins, which can then be connected to other warning devices if the pins are not immediately clearly noticed.

Further details and advantages of this invention will become apparent from the following description of the accompanying drawings, in which a preferred embodiment with the necessary details and individual parts is shown. The following are shown:

BRIEF DESCRIPTION OF THE DRAWINGS

FIG. 5: a display device in combination with a lance holder.

DETAILED DESCRIPTION

Figure 1:
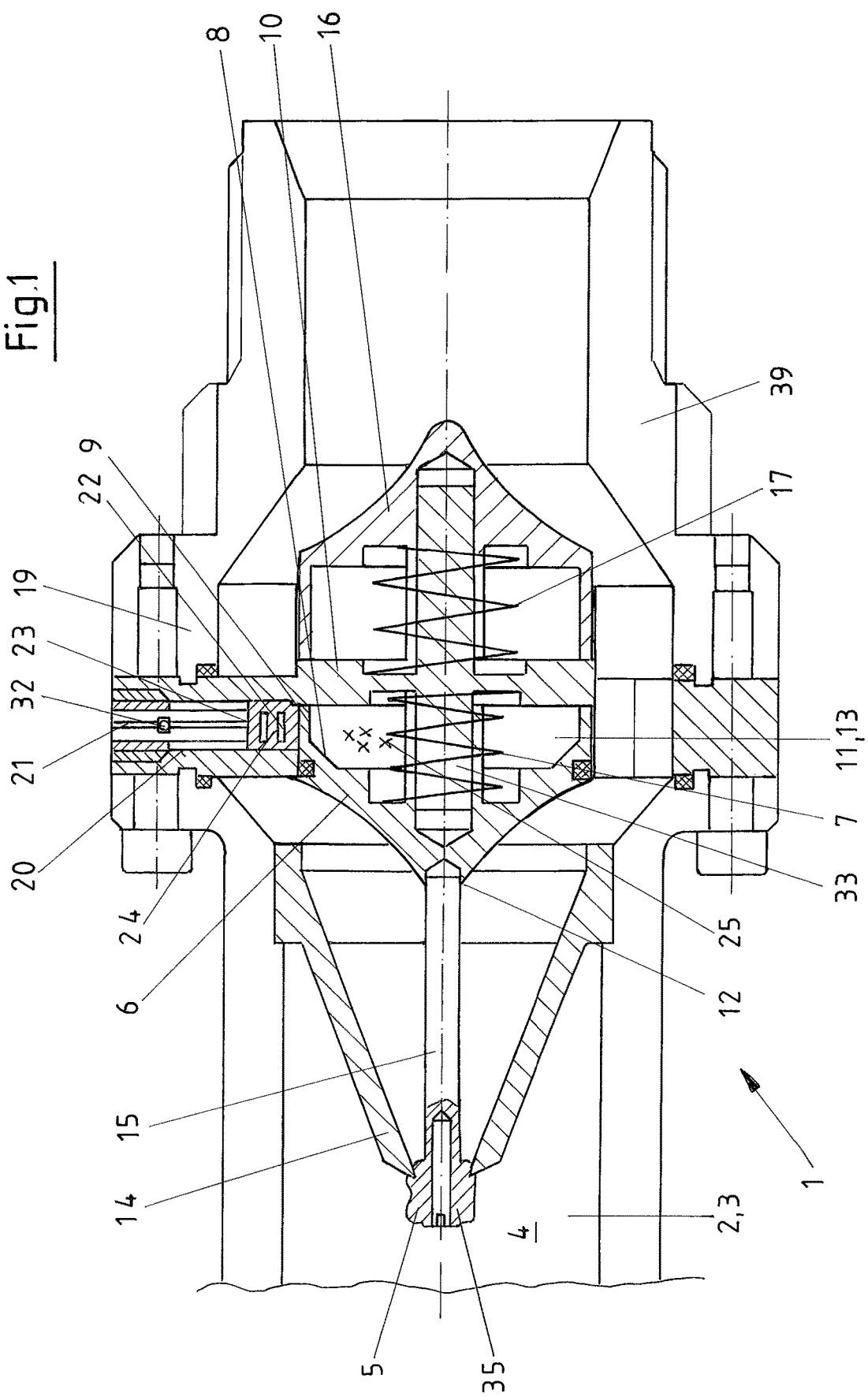
FIG. 1: a [cross] section through the display device with the two valves.

Thus, FIG. 1 shows a display device 1, which is integrated into a slag return safety device. Line 2 conveys oxygen gas and is therefore also referred to as an oxygen gas pipe 3. The oxygen gas is indicated in the other FIGS. 2, 3 and 4 by crosses and is also labeled with the reference number 4.

The slag return safety device has an outlet valve 6 and an inlet valve 16. The outlet valve 5 is designed to form a bowl 8 and is arranged with the edge of the bowl 9 on a partition wall 10, which separates the outlet valve 6 from the inlet valve 16. In the situation shown, the outlet valve 6 is open, as is the inlet valve 16. The outlet valve 6 has been brought into this open position against the force of the primary recoil spring 7 and the heat sensor 5, with its heat-unstable cap 35, ensures that the outlet valve remains in this position.

The bowl 8 of the outlet valve 6 forms a cavity 11 through this conformation with the partition wall 10. The bowl 8 is connected via a punch 15 with the heat sensor 5, in which the cap 35 ensures that the outlet valve 6 does not open. For this purpose, the cap 35 is connected to the holder 14. If the cap 35 melts, then the primary recoil spring 7 can ensure that the punch 15 is pushed through the holder 14 and the outlet valve 6 is guided into its closed position. The punch 15 is supported on the back of the bowl 12, while the primary recoil spring 7 is located in the bowl interior 13, i.e. in the cavity 11. In particular, the important primary recoil spring 7 is thus in normal operation in an area unaffected by the oxygen gas that is flowing by. The inlet valve 16 is pushed out of its sealed position by the gas stream, which is not shown here, i.e. the oxygen gas 4, with the secondary recoil spring 17 correspondingly being pressurized. If the oxygen gas 4 is no longer being transported through the line 2 or the oxygen gas pipe 3, the inlet valve 16 closes from the influence of the secondary recoil spring 17 into its closed position.

In the area of the cavity 11, which is separated from this by the bowl edge 9, a through bore 20 has been drilled through the wall 19 within which a sliding pin 21 is guided. At the opening part 22 of the pin 21, a seal 24 is provided, usually one or two O-rings. The upper end 23 ends with the outside of the wall 19. If the case now occurs that the cap 35 melts from the heat and the punch 15, as well as the entire bowl 8 and also the outlet valve 6, are moved in the direction of the cap 35, the cavity 11 is connected to the gas-conveying space, gas flows into the cavity 11 and the pin 21 is moved from its position until it has reached a predetermined projection 26 over the outside 27 of the oxygen gas pipe 3. It is indicated here that a whistle 32 is present in the pin 21, which responds when the pin 21 comes into contact with the residual gas 25 inside the cavity 11.

In order to equalize the movement of the outlet valve 6 in case of a response, the primary recoil spring 7 is arranged on a punch 33. Since the supply of gas is stopped by the operation of a closing valve, the inlet gas 25 maintains sufficient pressure to keep the pins 21 in the warning position.

Figure 2:
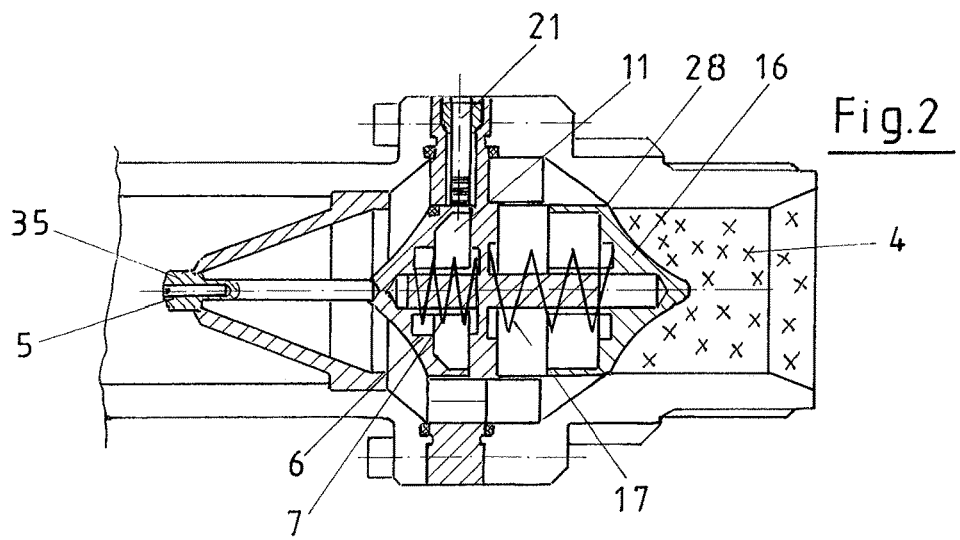
FIG. 2: the display device with closed inlet valve and opened outlet valve.

In FIG. 2, the oxygen gas 4 is also labeled by crosses. In the working position shown in FIG. 2, the inlet valve 16 is closed, i.e. it is effectively sealed against the edge 28. The outlet valve 6 is shown in the open position. The pin 21 cannot slip into the cavity 11 because it is supported on the bowl edge 9. On the other hand, the seal 24 ensures that it also cannot move beyond the outside 27 of the oxygen gas pipe 3. The secondary recoil spring 17 is relieved, while the primary recoil spring 7 is in the cocked position. The cap 35 of the heat sensor 5 ensures that the outlet valve 6 cannot move to the closed position. Although there is still gas shown everywhere in FIG. 2, it cannot flow because the inlet valve 16 is closed.

Figure 3:
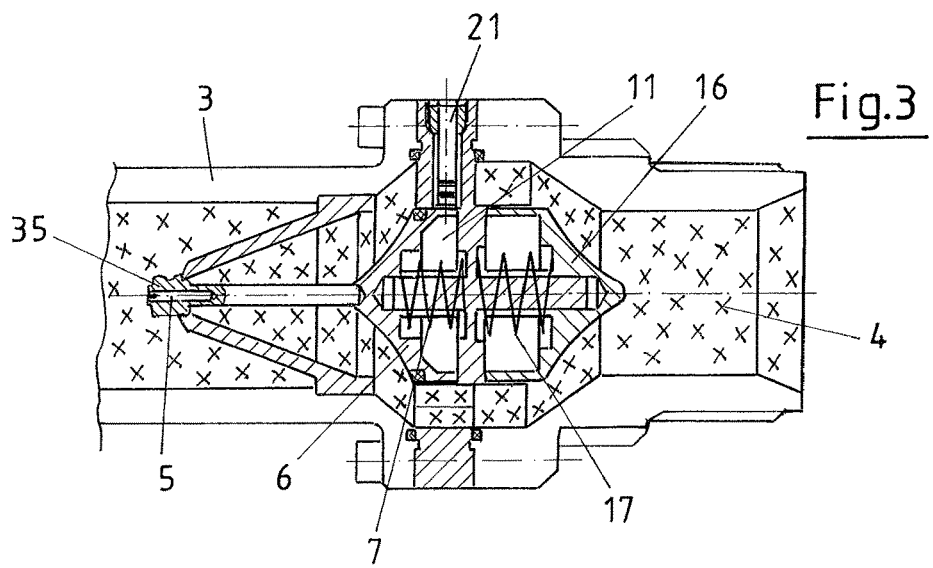
FIG. 3: the display device with open inlet valve and open outlet valve.

This changes, as shown in FIG. 3, when the inlet valve 16 is opened by the gas pressure. The oxygen gas 4 can now flow past the inlet valve 16 through corresponding channels and opening areas on the outlet valve 6 into the discharging part of the oxygen gas pipe 3.

Figure 4:
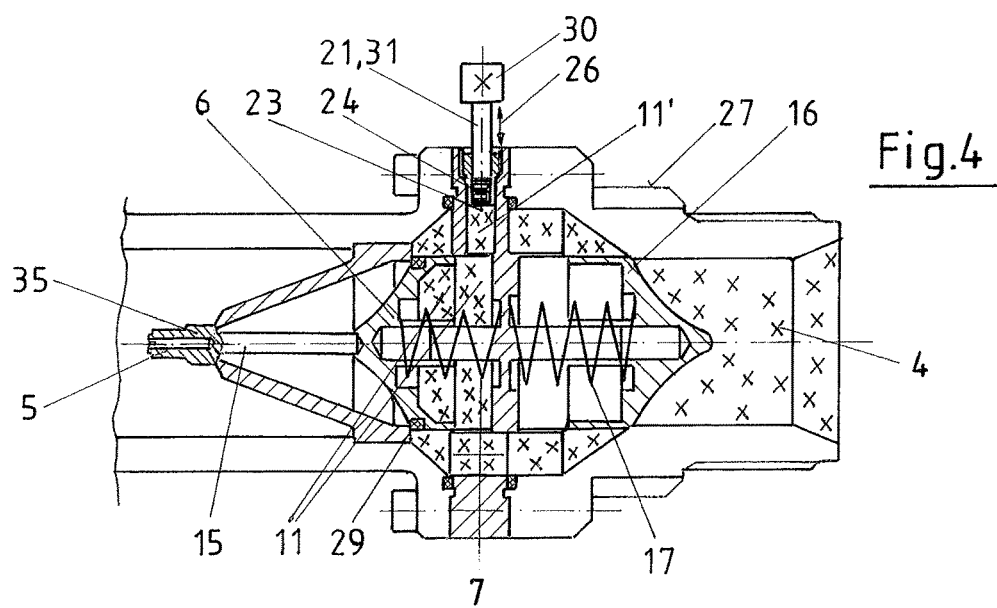
FIG. 4: the display device with the initiation of the display device activated by the closing of the outlet valve

If something dangerous occurs now, i.e. the cap 35 melts away, as shown in FIG. 4, the primary recoil spring 7 can bring the outlet valve 6 and the bowl 8 into the closed position. In FIG. 3, a seal is indicated on the outer edge of the bowl 8, which rests against the sealing edge 29 and ensures that no more oxygen gas can reach the discharging area of the oxygen gas pipe 3.

Through the movement of the bowl 8, the bowl edge 9 moves away from the partition wall 10, so that now the oxygen gas 4 that still remains can flow into the cavity 11 between the partition wall 10 and the bowl interior 13. Thus, the inlet gas 25 that is also under high inlet pressure is now under the pin 21, so that it is pushed from its position to the display position, i.e. the end 31 of the pin 21 that can be pushed out reaches the end position shown in FIG. 4. Thus, the pin 21 can be used simultaneously to turn on a signal system 30, which is arranged above this, which also provides a visual and/or acoustical warning of the dangerous situation, in addition to the fact that the pin 21 is now on the wall.

FIG. 5 shows a lance holder housing 40 to which the valve housing 39 of the display device 1 is screwed. Here the position is shown where the outlet valve 6 has not responded. The inlet valve 16, however, is closed. The shut-off valve 47 is also closed, which is arranged between the valve housing 39 and the actual lance holder, but in the lance holder housing 40. A lance pipe 41 is inserted into the lance holder housing 40, which is fixed by the clamping sleeve 42 and the pressure sleeve 45 with clamping balls 46 to the extent that it is displaced during further operation of the lever 43 or the manual lever 44 so that the shut-off valve 47 is opened. The clamping balls 46 are pressed by the bevel 48 against the wall of the lance pipe 41 so that mutual displacement is ensured.

The claims and the description are intended for oxygen-conveying pipes 3 and a display device 1 used for this purpose. Display devices that are designed in the same way can also be used for fuel gas pipes or natural gas pipes.

All of the aforementioned features, including those that are only shown in the drawings, are considered to be essential to the invention individually and in combination.

The invention claimed is:

1. Device for indicating dangerous situations for gas-conveying lines (2), comprising,
   integrated oxygen gas pipes (3) which are adapted to provide blockage of the oxygen gas when there is a risk of ignition of the oxygen gas, the device further comprising
   a heat sensor (5) and an outlet valve (6) that is adapted to be closed by a primary recoil spring (7),
   an inlet valve (16) adapted to be shut off in case of failure of the gas flow
   wherein the outlet valve (6) is shaped as a bowl (8), having a bowl edge (9) configured to seal a partition wall (10), with a cavity (11), at a back 12 of the bowl,
   a back of the bowl (12) connected to the heat sensor (5) via a punch (15),
   the inlet valve (16) being arranged on an opposite side of the partition wall (10), the inlet valve being adapted to open by the gas flow from the oxygen gas (4) against a return force of a secondary recoil spring (17),
   wherein the wall (19) of the oxygen gas pipe (3) has at least one through bore (20) in an area of the outlet valve (6),
   a sliding pin (21) is mounted, with its opening part (22) located below the pin (21) and wherein, through a response from the heat sensor (5) and closure of the outlet valve (6), the opening part is connected with the oxygen gas (4), which is under residual pressure, in the cavity (11).

2. Device according to claim 1 wherein the pin (21) has a seal (24) at the lower end (23), which is facing the cavity (11).

3. Device according to claim 1 wherein the pin (21) is designed to slide via the residual gas (25) in the cavity into a position that is correspondingly set with a clear projection (26) over an outside (27) of the oxygen gas line (3).

4. Device according to claim 1 wherein the pin (21) is functionally connected to a signal device (30).

5. Device according to claim 1 wherein the pin (21) is equipped with a signal light at the end (31) that can be pushed out of the through bore (20), wherein the signal light (31) is adapted to switch on after reaching a predetermined projection (26) over the outside (27) of the oxygen pipe (3).

6. Device according to claim 1 wherein the pin (21) is equipped with a whistle (32), which, after extension of the pin (21), is connected to the cavity (11) between the partition wall (10) and an interior (13) of the bowl (8).

7. Device according to claim 1 wherein at the bottom of the bowl-like (8) of the outlet valve (6), there is a punch (15) that on its free end has a cap 25, which is adapted to be destructible if it the cap is triggered.

8. Device according to claim 1 wherein the heat sensor (5) is a heat-unstable cap (35) on a free end of the punch (15) that prevents pushing of the punch (15) over a force of a previously tightened primary recoil spring (7) of the outlet valve (6).

9. Device according to claim 1 wherein a closure of the outlet valve (6) is carried out in the event of danger by the primary recoil spring (7), which is arranged as a support on the partition wall (10) and in the interior of the bowl (13).

10. Device according to claim 1 wherein the outlet valve (6) is located in a valve housing (39), together with the pin (21) and the inlet valve (16) that is located on the opposite side of the partition wall (10), which can be coupled with a lance holder housing (40) for an oxygen gas-conveying lance pipe (41), whose clamping sleeve (42) is pivotally connected over a toggle lever (43) via a manual lever (44) and is designed to impact a pressure sleeve (45), which is arranged and designed to press clamping balls (46) onto an inserted lance pipe (41) via the clamping sleeve (42), in which the displacement of the clamping sleeve (42) and the pressure sleeve (45) can also move the fixed lance pipe (41) to open a shut-off valve (47) and release the gas flow through the shut-off valve (47) and the display device (1), connecting to a possible source of danger.

* * * * *